US011887379B2

(12) United States Patent
Kim et al.

(10) Patent No.: US 11,887,379 B2
(45) Date of Patent: Jan. 30, 2024

(54) ROAD SIGN CONTENT PREDICTION AND SEARCH IN SMART DATA MANAGEMENT FOR TRAINING MACHINE LEARNING MODEL

(71) Applicant: Robert Bosch GmbH, Stuttgart (DE)

(72) Inventors: Ji Eun Kim, Pittsburgh, PA (US); Mohammad Sadegh Norouzzadeh, Pittsburgh, PA (US); Kevin H. Huang, Pittsburgh, PA (US); Shashank Shekhar, Ranchi (IN)

(73) Assignee: Robert Bosch GmbH

( * ) Notice: Subject to any disclaimer, the term of this patent is extended or adjusted under 35 U.S.C. 154(b) by 352 days.

(21) Appl. No.: 17/404,333

(22) Filed: Aug. 17, 2021

(65) Prior Publication Data

US 2023/0058082 A1 Feb. 23, 2023

(51) Int. Cl.
*G06N 3/08* (2023.01)
*G06V 20/58* (2022.01)
(Continued)

(52) U.S. Cl.
CPC ............ *G06V 20/582* (2022.01); *G06F 16/53* (2019.01); *G06F 16/9024* (2019.01);
(Continued)

(58) Field of Classification Search
CPC ............... G06V 20/582; G06V 10/454; G06V 10/7788; G06V 10/82; G06V 10/987;
(Continued)

(56) References Cited

U.S. PATENT DOCUMENTS 10,332,266 B2 6/2019 Chen et al.
10,928,828 B2 2/2021 Xu et al.
(Continued)

FOREIGN PATENT DOCUMENTS

CN 106909886 A 6/2017
CN 111178153 A 5/2020
(Continued)

OTHER PUBLICATIONS

Kim et al., "Variational Prototyping-Encoder: One-Shot Learning with Prototypical Images", Dept. of Electrical Engineering, KAIST, Daejeon, Korea, MIT CSAIL, Cambridge, US, 2019, 9 pages.
(Continued)

*Primary Examiner* — Stephen P Coleman
(74) *Attorney, Agent, or Firm* — Dickinson Wright PLLC

(57) ABSTRACT

Systems and method for machine-learning assisted road sign content prediction and machine learning training is disclosed. A sign detector model processes images or video with road signs. A visual attribute prediction model extracts visual attributes of the sign in the image. The visual attribute prediction model can communicate with a knowledge graph reasoner to validate the visual attribute prediction model by applying various rules to the output of the visual attribute prediction model. A plurality of potential sign candidates are retrieved that match the visual attributes of the image subject to the visual attribute prediction model, and the rules help to reduce the list of potential sign candidates and improve accuracy of the model.

20 Claims, 9 Drawing Sheets

(51) Int. Cl.
    *G06N 3/04*     (2023.01)
    *G06F 16/53*     (2019.01)
    *G06F 16/901*     (2019.01)
    *G06F 18/22*     (2023.01)
    *G06F 18/40*     (2023.01)
    *G06F 18/214*     (2023.01)
    *G06F 18/21*     (2023.01)

(52) U.S. Cl.
    CPC ........ *G06F 18/214* (2023.01); *G06F 18/2178* (2023.01); *G06F 18/22* (2023.01); *G06F 18/41* (2023.01); *G06N 3/04* (2013.01); *G06N 3/08* (2013.01)

(58) Field of Classification Search
    CPC .... G06F 16/53; G06F 16/9024; G06F 18/214; G06F 18/2178; G06F 18/22; G06F 18/41; G06F 18/24765; G06N 3/04; G06N 3/08; G06N 3/042; G06N 3/0455; G06N 3/091; G06N 3/048; G06N 3/0464; G06N 3/0895; G06N 5/022

USPC ........................................................ 382/103
See application file for complete search history.

(56) References Cited

U.S. PATENT DOCUMENTS

2017/0323452 A1* 11/2017 Chen .................... G06V 20/582
2020/0320676 A1* 10/2020 Hardy ..................... G06F 3/147

FOREIGN PATENT DOCUMENTS

CN        107784042 B     2/2021
DE     102020004790 A1     11/2020

OTHER PUBLICATIONS

Kim et al., "Accelerating Road Sign Ground Truth Construction with Knowledge Graph and Machine Learning", arXiv:2012.02672v1 [cs.AI] Dec. 4, 2020, 16 pages.

* cited by examiner

ROAD SIGN CONTENT PREDICTION AND SEARCH IN SMART DATA MANAGEMENT FOR TRAINING MACHINE LEARNING MODEL

TECHNICAL FIELD

The present disclosure relates to road sign content prediction and search in smart data management for training machine learning models.

BACKGROUND

Recognizing and understanding road signs are important features of advanced driver-assistance systems (ADAS), which are offered in modern vehicles via technologies such as road sign recognition (RSR) or intelligent speed adaption (ISA). Such features may be mandatory according to guidelines that vary by each country. Recent RSR and ISA solutions rely on heavy use of machine learning methods; balanced datasets with various sign categories are crucial to develop and train machine learning models for road signs of various countries. The number of road sign images to be annotated and categorized can be enormous, up to more than ten million each year. Any representative sample of these images will be of considerable size.

Road and traffic signs across multiple countries can be very different. Signs in each country follow several conventions (e.g., Vienna Convention, Southern Africa Development Community (SADC) Convention, Secretariat for Central American Economic Integration (SIECA per its Spanish acronym) Convention, Manual on Uniform Traffic Control Devices (MUTCD) Convention) but with variants among the countries. No universal machine classifier is available. To train such a universal classifier for signs in all countries, there should be a large enough dataset including as many annotated signs as possible. It is very challenging for those responsible for dataset management to go through all unlabeled videos/images in order to select videos and unlabeled data with rare signs.

SUMMARY

According to an embodiment, a system for training a machine learning model to recognize road signs includes a user interface; a storage configured to maintain image data including video having a sequence of frames; and a processor in communication with the storage and the user interface. The processor is programmed to: detect a road sign in the frames, crop at least one of the frames based on the detected road sign to produce a cropped image that includes the road sign, execute a visual attribute prediction model to determine probabilities of predefined visual attributes present in the cropped image, query a knowledge graph reasoner to access a plurality of rules relating to the predefined visual attributes, validate the visual attribute prediction model by removing at least one of the probabilities of presence of predefined visual attributes in the cropped image based on the rules, and output at least one sign candidate from a plurality of stored sign templates, wherein the at least one sign candidate matches the road sign within the cropped image based on the validated visual attribute prediction model.

According to an embodiment, a method for training a machine learning model to recognize road signs includes: maintaining image data including video having a sequence of frames; detecting a road sign in one of the frames; cropping at least one of the frames based on the detected road sign to produce a copped image that includes the road sign; executing a visual attribute prediction model to determine a plurality of probabilities of a presence of predefined visual attributes present in the cropped image; querying a knowledge graph reasoner to access a plurality of rules related to the predefined visual attributes; validating the visual attribute prediction model by removing at least one of the probabilities of presence of predefined visual attributes in the cropped image based on the rules; and outputting at least one sign candidate from a plurality of stored sign templates, wherein the at least one sign candidate matches the road sign within the cropped image based on the validated visual attribute prediction model.

According to an embodiment, a system for training a machine learning model to recognize road signs includes: a user interface; a storage configured to maintain (i) image data of a plurality of images, (ii) a list of predefined visual attributes found in images of road signs, and (iii) a plurality of stored sign template images; and a processor in communication with the storage and the user interface. The processor is programmed to: receive a cropped image of a road sign detected in an environment surrounding a vehicle, execute a visual attribute prediction model to determine whether one or more of the predefined visual attributes are present in the cropped image, wherein the visual attribute prediction model is configured to assign a probability of presence to each of the one or more predefined visual attributes, query a knowledge graph reasoner to access a plurality of rules relating to the one or more predefined visual attributes present in the cropped image, validate the visual attribute prediction model by removing the probability of presence of at least one of the predefined visual attributes present in the cropped image based on the rules, and output a sign template image from the plurality of stored sign template images that matches the road sign within the cropped image based on the validated visual attribute prediction model.

DETAILED DESCRIPTION

Figure 1:
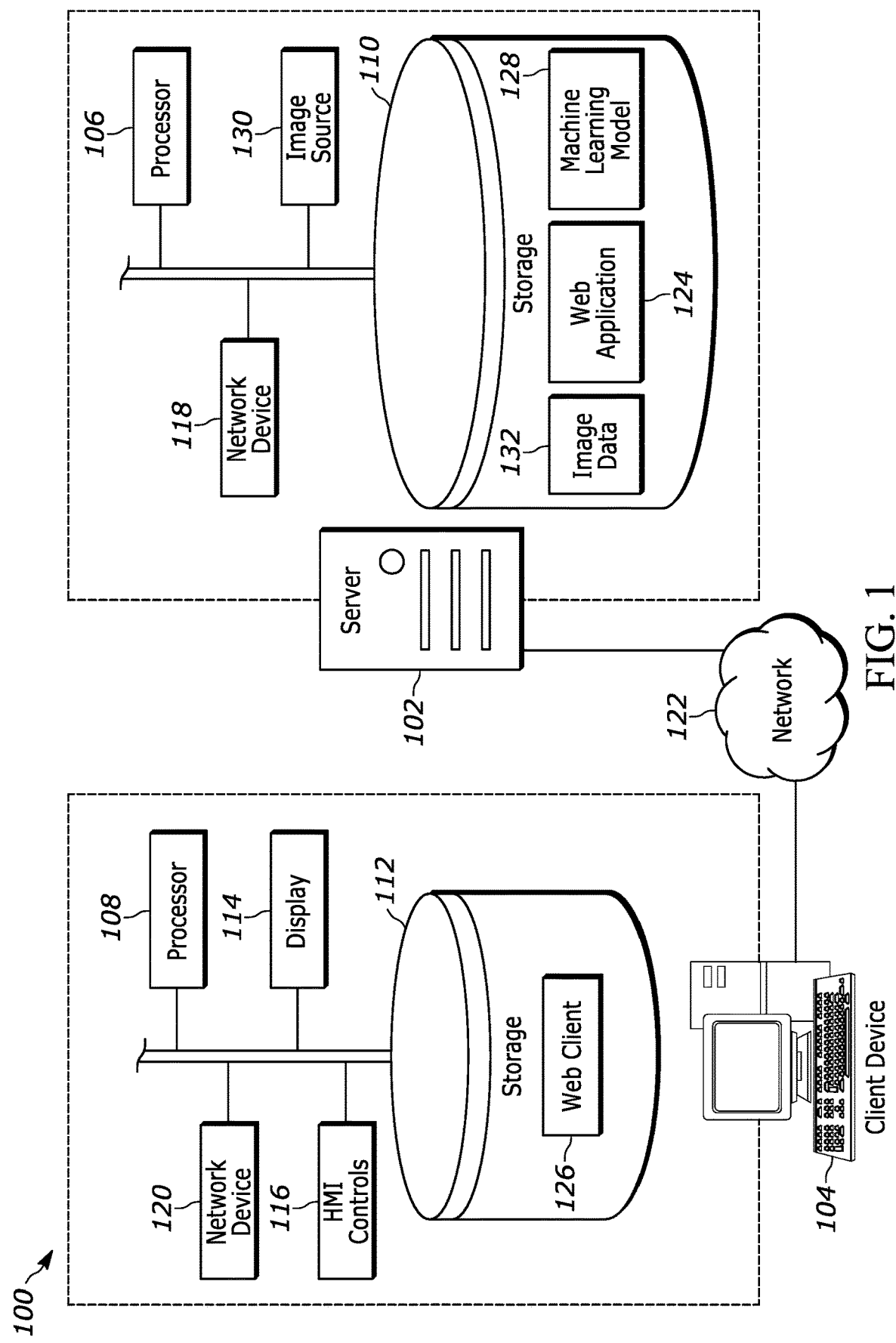
FIG. 1 system for carrying out training of a machine learning model to recognize road signs, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Recognizing and understanding road signs are important features of advanced driver-assistance systems (ADAS), which are offered in modern vehicles via technologies such as road sign recognition (RSR) or intelligent speed adaption (ISA). These technologies may involve analyzing a seemingly unlimited supply of recorded video from driving vehicles, and spotting road signs on the recorded video.

In training a machine learning model to recognize a road sign, there are many road signs to search through to find signs of interests (e.g., for machine learning performance improvement) to the inputted image. The United States of America alone has more than 800 federally approved road signs, and more than 10 states in the USA have their own state conventions which are different from the Federal Convention. Another challenge lies in the fact that different countries follow different conventions for road signs. The USA follows MUTCD, while European countries adopt the Vienna convention. Some countries adopt multiple conventions, and some introduce different variants in features such as colors, fonts, size, etc.

The present disclosure addresses systems and methods for predicting road sign classes utilizing machine learning models, knowledge graphs and an optional human validation tasks. The proposed systems and methods can be used for big data management including a smart selection of unlabeled data for data labeling in order to train machine learning models.

Moreover, categories of road signs in recorded videos for annotation normally have an imbalanced distribution. Some signs such as speed limit appear frequently while some other signs such as town entrance are rare. Having a balanced dataset with diverse sign categories in different scenes is important for having a robust machine learning model.

Having a smart and efficient way to select sequences with diverse categories of signs plays an important role in constructing ground truths to train machine learning models. In current practice, the selection process heavily relies on human effort and requires the annotators to have knowledge about various target signs across countries. The present disclosure employs various machine learning and knowledge graph techniques to automate these human-oriented tasks in order to reduce the time and the cost for finding target signs.

The proposed machine learning methods described herein include (a) a sign detection model to locate road signs in each frame or frame of a video sequence, (b) a visual attribute prediction model to recognize sign attributes such as sign shapes, colors, icons and text, etc. in a road sign knowledge graph, (c) a knowledge graph reasoning of visual attribution prediction, (d) a road sign template search in the knowledge graph (with visual attribute criteria), and (e) a few-shot learning model to provide a sorted list of the sign template candidates from the knowledge graph with a normalized similarity score. A human validation task can be appended automatically or with experts' interaction depending on prediction scores from machine learning methods and/or the domain expert's interest.

The prediction results could be added to the data management system, enabling the algorithm developer or the dataset management responsible to efficiently explore and search the big data by various meta-data including predicted road sign content/class and visual attributes.

FIG. 1 illustrates an example system 100 for carrying out training of a machine learning model to recognize road signs based on image data, according to an embodiment. The system 100 includes a server 102 that hosts a web application 124 that is accessible to client devices 104 over a network 122. The server 102 includes a processor 106 that is operatively connected to a storage 110 and to a network device 118. The server 102 further includes an image data input source 130 for the receipt of image data 132. The client device 104 includes a processor 108 that is operatively connected to a storage 112, a display device 114, human-machine interface (HMI) controls 116, and a network device 120. It should be noted that the example system 100 is one example, and other systems 100 may be used. For instance, while only one client device 104 is shown, systems 100 including multiple client devices 104 are contemplated. As another possibility, while the example implementation is shown as a web-based application, alternate systems may be implemented as standalone systems or as client-server systems with thick client software Each of the processor 106 of the server 102 and the processor 108 of the client device 104 may include one or more integrated circuits that implement the functionality of a central processing unit (CPU) and/or graphics processing unit (GPU). In some examples, the processors 106, 108 are a system on a chip (SoC) that integrates the functionality of the CPU and GPU. The SoC may optionally include other components such as, for example, the storage 110 and the network device 118 or 120 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation, the processors 106, 108 execute stored program instructions that are retrieved from the storages 110, 112, respectively. The stored program instructions accordingly include software that controls the operation of the processors 106, 108 to perform the operations described herein. The storages 110, 112 may include both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU of the client device 104 may include hardware and software for display of at least two-dimensional (2D) and optionally three-dimensional (3D) graphics to a display device 114 of the client. The display device 114 may include an electronic display screen, projector, printer, or any other suitable device that reproduces a graphical display. In some examples, the processor 108 of the client 104 executes software programs using the hardware functionality in the GPU to accelerate the performance of machine learning or other computing operations described herein.

The HMI controls 116 of the client 104 may include any of various devices that enable the client device 104 of the system 100 to receive control input from workers or other users. Examples of suitable input devices that receive human interface inputs may include keyboards, mice, trackballs, touchscreens, voice input devices, graphics tablets, and the like.

The network devices 118, 120 may each include any of various devices that enable the server 102 and client device 104, respectively, to send and/or receive data from external devices over the network 122. Examples of suitable network devices 118, 120 include a network adapter or peripheral interconnection device that receives data from another computer or external data storage device, which can be useful for receiving large sets of data in an efficient manner.

The web application 124 is an example of a software application executed by the server 102. When executed, the web application 124 may use various algorithms to perform aspects of the operations described herein, such as enabling human validation or data annotation. In an example, the web application 124 may include instructions executable by the processor 106 of the server 102 as discussed above. Computer-executable instructions may be compiled or interpreted from computer programs created using a variety of programming languages and/or technologies, including, without limitation, and either alone or in combination, JAVA, C, C++, C#, VISUAL BASIC, JAVASCRIPT, PYTHON, PERL, PL/SQL, etc. In general, the processor 106 receives the instructions, e.g., from the storage 110, a computer-readable medium, etc., and executes these instructions, thereby performing one or more processes, including one or more of the processes described herein. Such instructions and other data may be stored and transmitted using a variety of computer-readable media.

The web client 126 may be a web browser, or other web-based client, executed by the client device 104. When executed, the web client 126 may allow the client device 104 to access the web application 124 to display user interfaces of the web application 124. The web client 126 may further provide input received via the HMI controls 116 to the web application 124 of the server 102 over the network 122.

In artificial intelligence (AI) or machine learning systems, model-based reasoning refers to an inference method that operates based on a machine learning model 128 of a worldview to be analyzed. Generally, the machine learning model 128 is trained to learn a function that provides a precise correlation between input values and output values. At runtime, a machine learning engine uses the knowledge encoded in the machine learning model 128 against observed data to derive conclusions such as a diagnosis or a prediction. One example machine learning system may include the TensorFlow AI engine made available by Alphabet Inc. of Mountain View, Calif., although other machine learning systems may additionally or alternately be used. As discussed in detail herein, the web applications disclosed herein and the machine learning model 128 may be configured to recognize features of the image data 132 for use in the efficient and scalable ground truths generation system.

The image data source 130 may be a camera, e.g., mounted on a moving object such as car, wall, pole, or installed in a mobile device, configured to capture image data 132. In another example, the image data input 132 may be an interface, such as the network device 118 or an interface to the storage 110, for the retrieval of previously-captured image data 132. The image data 132 may be video, e.g., a sequence of images. Each image in the image data 132 may be referred to herein as a frame. The image data 132 may be stored and maintained in the storage 110 for later retrieval and processing.

The system 100 may also include a knowledge graph (KG). The knowledge graph may represent a collection of interlinked descriptions of entities—real-world objects, events, situations or abstract concepts—where the descriptions utilize a formal structure that allows both people and computers to process them in an efficient and clear manner. The knowledge graph may be a type of database. The entity descriptions may contribute to one another, forming a network, where each entity represents part of the description of the entities related to it.

Figure 2:
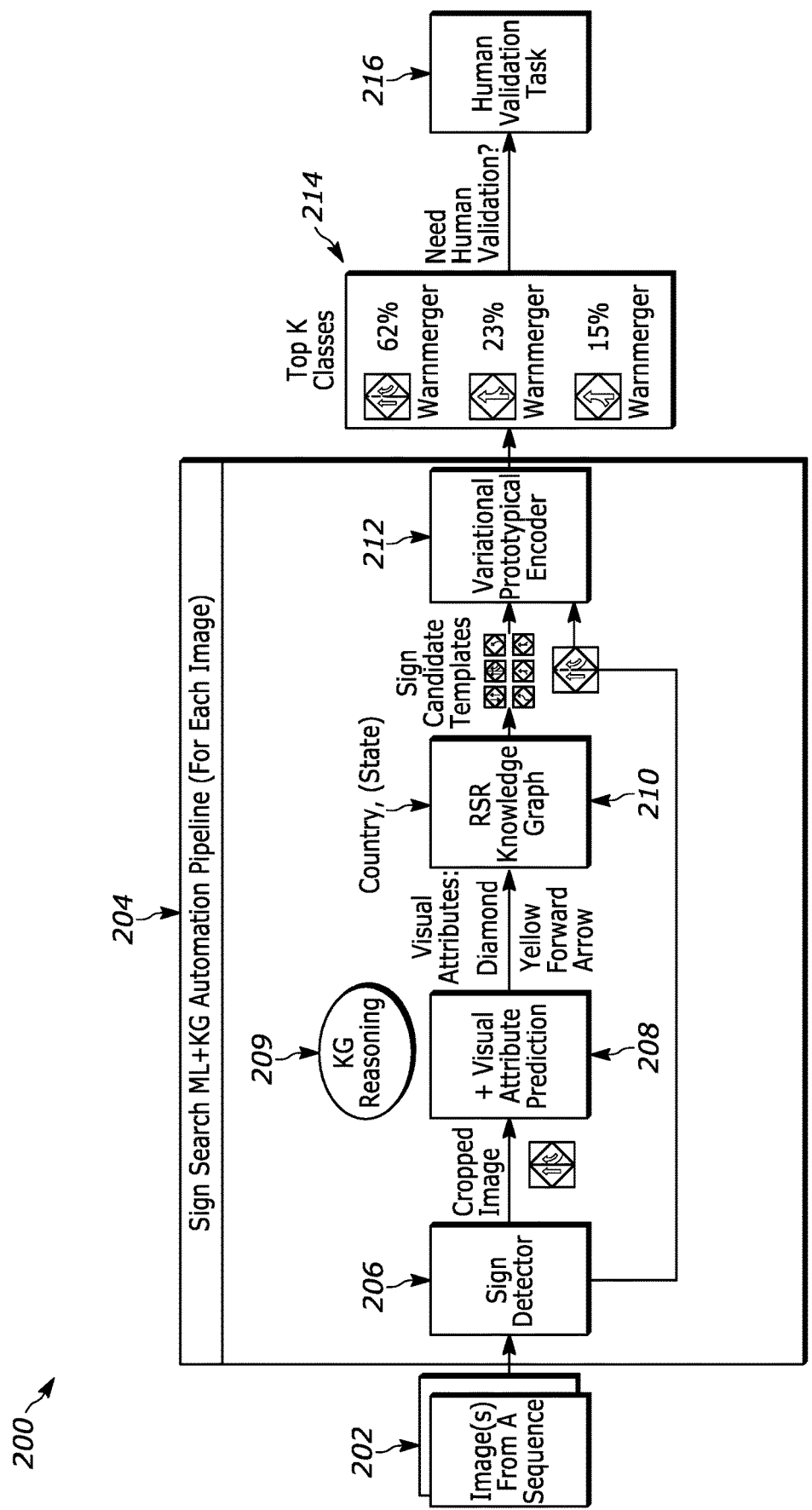
FIG. 2 illustrates a flow chart of utilizing machine learning and knowledge graph systems for road sign content prediction with optional human in the loop, according to an embodiment.
Figure 3:
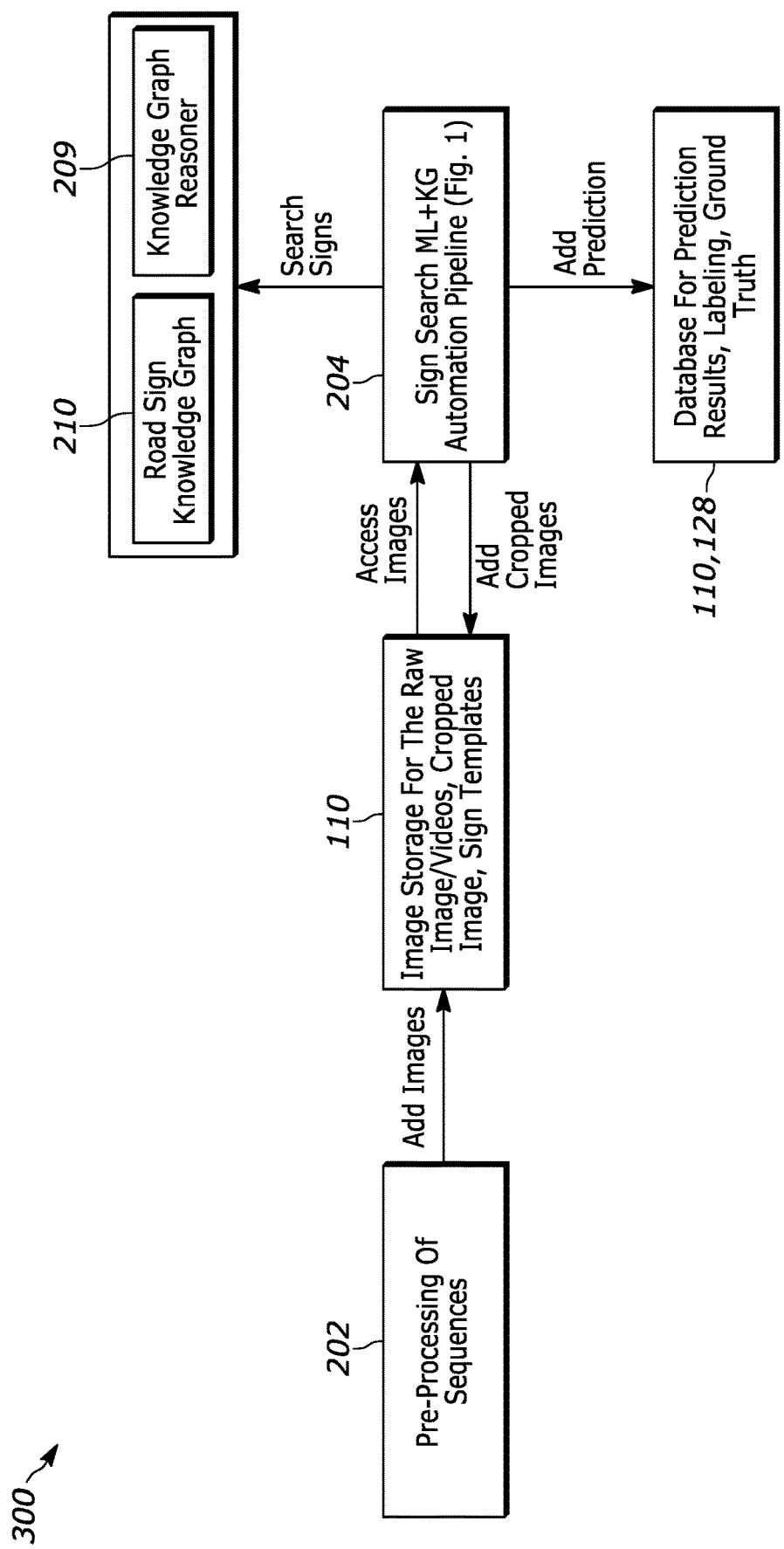
FIG. 3 illustrates a system over for road sign content prediction according to an embodiment.

FIG. 2 illustrates a road sign content prediction system 200 according to an embodiment. As will be described, the system utilizes machine learning and knowledge graph systems for road sign content prediction with an optional human in the loop step. In general, the system 200 receives or pre-processes images at 202, and outputs the pre-processed images into a road sign search and knowledge graph automation pipeline 204. The road sign search and knowledge graph automation pipeline 204 includes a collection of machine learning models and knowledge graphs shown generally at 206-212 which will be described further below. The machine learning models can incorporate the teachings of the machine learning model 128 described above. One embodiment of a system overview 300 of the road sign search and knowledge graph automation pipeline 204 is illustrated in FIG. 3. The road sign search and knowledge graph automation pipeline 204 outputs a limited number of potential sign classes at 214 that the input image can be classified as. If needed, human validation can be used at 216.

One or more images are input at 202 and can be preprocessed as described herein. This may be or include image data 132 described above. In one embodiment, image data is video is taken from an image source 130. In case the length of the recorded video is long, the video can be divided to manageable lengths such as one minute video clips. Alternatively, the image data is photographs taken from the image source 130 such as a camera. In another embodiment, the image data is spliced into clips that each include a detected road sign. In any embodiment, the image(s) can be extracted and converted to RGB image or truecolor image that defines red, green, and blue color components for each individual pixel in the image. The preprocessed images can be rescaled and enhanced as needed. The preprocessed images can also be temporarily stored if needed, such as in memory 110 as image data 132.

The preprocessed image(s) are then input to a sign detector model 206 whereupon a machine learning model detects road signs in the image(s). The sign detector model 206 is trained to put a bounding box over the sign in the images. The bounding box may be placed over the image of the road sign based on the location of the sign's corners or vertices. To assist in detecting road signs, depth data may be optionally used from a sensor on the vehicle that determines a depth to any point on the image (e.g., RADAR, LIDAR, etc.) or from stereo cameras. The sign detector model 206 can be trained based on previous human interaction of placing bounding boxes over signs in images, which are known as ground truths. Detected signs are selected for the next phase (e.g., visual attribute prediction) with criteria such as the size of the bounding box, confidence score from the model, etc.

The sign detector model 206 can crop the image and upload to storage after detection. The meta-information such as the video name, frame number for each cropped image, time stamp, and the like are added to the data management system along with the cropped image location (e.g., the location of the vehicle where the image was taken, via GPS data or the like). External contexts such as weather of the recorded time and map information obtained from other sources may be added to the data. This detection method can be replaced by other methods such as semantic segmentation which can ultimately infer a bounding box out of boundaries of segmentation.

The one or more processors in the system may then perform a visual attribute prediction model 208, or visual attribute extraction model. The visual attribute prediction model 208 is a second trained machine learning model of the system 200. The visual attribute prediction model 208 receives the cropped images of signs from the output of the sign detector model 206, and is intended to extract visual attributes of the signs. The visual attributes or characteristics of the sign images may include physical shape, size, background color, foreground color, border presence or color, presence of an arrow, direction of the arrow, icons or symbols, and text. For example, an image of a yield sign input into the visual attribute prediction model 208 may cause the visual attribute prediction model 208 to output visual attributes such as triangular shape, red triangle, white center, white border, and text reading "YIELD".

The visual attribute prediction model 208 is configured to detect the existence of a predefined set of visual attributes. The predefined set of visual attributes may be input manually into the system, or learned through training. For each of the visual attributes, the visual attribute prediction model 208 can provide a real number between 0 and 1 which indicates the probability of the existence of that visual attribute in the input sign. This may be a confidence scale of the presence of each detected visual attribute.

Figure 4:
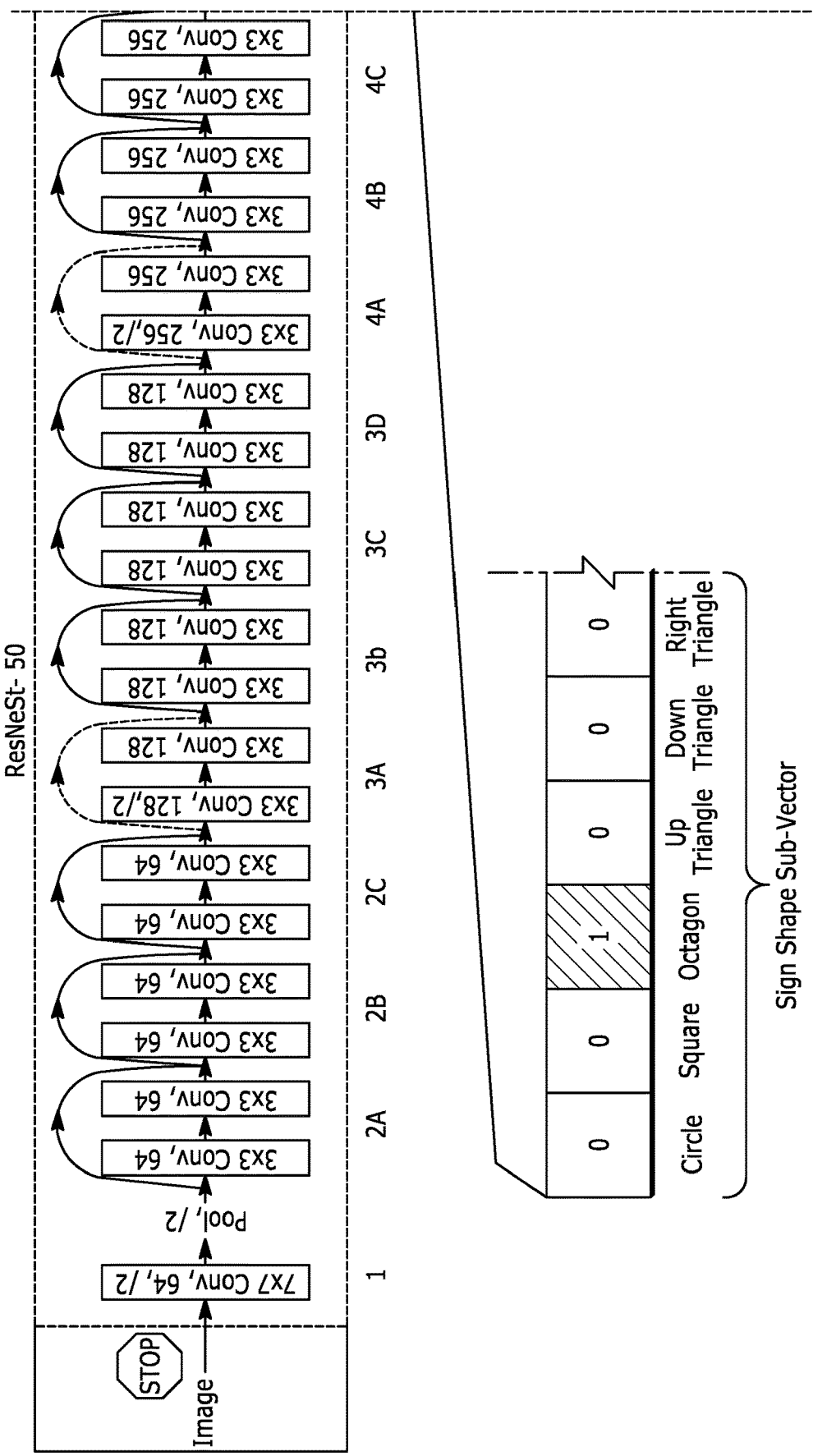
FIG. 4 illustrates a visual attribute prediction model according to an embodiment.
Figure 4:
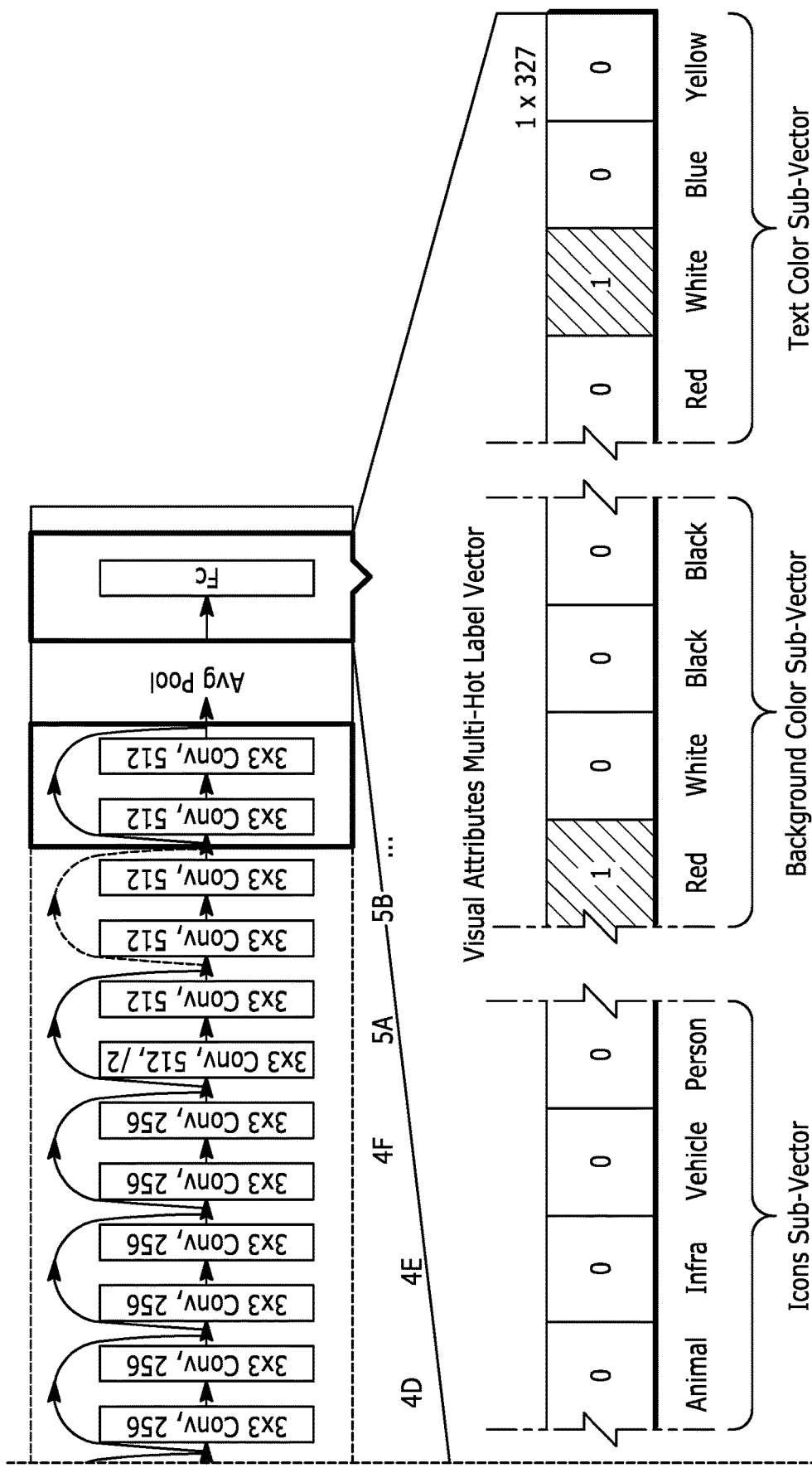

FIG. 4 illustrates one example of the visual attribute prediction model 208. In this embodiment, the visual attribute prediction model 208 is a Residual Network (i.e., ResNet) design, a deep convolutional neural network design. The overall residual learning architecture shown in FIG. 4 is but one example of a residual learning model. Architecture. The model may learn a hierarchical set of representations, such that the models learns low, mid, and high-level features with each layer enriching the levels of the features. For example, the model may learn edges (low-level), shapes (mid-level), and objects like road signs (high-level). Each layer is represented in FIG. 4 (e.g., layer 1, ... 2a-2c, 2a-2d, 4a-4f, etc.) Each layer may have sub vectors with various shape attributes. In the illustrated example, one of the downstream or lower level layer has a sign shape sub-vector (e.g., the detected shape of the sign), an icon sub-vector (e.g., what type of icon is present on the sign), a background color sub-vector (e.g., what color is the background of the sign), and a text color sub-vector (e.g., what color is any detected text on the sign). Of course, many more visual attribute sub-vectors may be present to help characterize the detected road sign, such as the size of the text, the presence and/or direction of any arrows, and the like.

Batch normalization may be used to train the model, wherein the inputs are standardized to a layer for each mini-batch. It does this by scaling the output of the layer, specifically by standardizing the activations of each input variable per mini-batch, such as the activations of a node from the previous layer. Standardization refers to rescaling data to have a mean of zero and a standard deviation of one, e.g. a standard Gaussian. This process can also be referred to as whitening. Standardizing the activations of the prior layer means that assumptions the subsequent layer makes about the spread and distribution of inputs during the weight update will not dramatically change. This has the effect of stabilizing and increasing the speed of the training process of the deep neural network. Batch normalization can be implemented during training by calculating the mean and standard deviation of each input variable to a layer per mini-batch and using these statistics to perform the standardization.

In the context of the illustrated embodiment of FIG. 4, the input is a cropped image of a stop sign. By proceeding down the layers or vectors in the model, the model determines that the shape of the sign is an octagon, the background color is red, and the text color is white. Also, no icon is detected. When these positive determinations are made, an associated value is changed from 0 to 1.

For each of the visual attribute, the model can provide a number between 0 and 1 which indicates the probability of existence of that particular visual attribute in the input image. Again, given the example of the stop sign in FIG. 4, we may expect that the model would predict a high probability for a red background color, a white foreground color, an existence of text, and an octagon shape for example. We may also expect that the model 208 would predict a low probability for blue background, or a triangle shape for example. The system may have threshold value for a predicted probability value to finally provide visual attribution prediction with or without knowledge graph reasoner 209.

Referring back to FIG. 2, the road sign content prediction system 200 may also implement a knowledge graph (KG) reasoner 209 and access a corresponding knowledge graph to complement the performance of the visual attribute prediction model 208. If the performance of the visual attribute prediction model 208 is inaccurate, then the knowledge graph reasoner 209 can be relied on to ignore incorrect predictions output by the visual attribute prediction model 208. In general, the knowledge graph reasoner 209 can validate the output of the visual attribute prediction model 208 by applying rules that are either manually crafted by the domain expert or including analyzing links (e.g., in triples) along with the machine prediction score.

For example, in one embodiment, the following rule can be implemented with respect to the sign image: the background color of the sign image should not be the same as the color of the text or the symbols within the sign. Taking the example of a stop sign, if the visual attribute prediction model 208 outputs confidence that the background color is red and the color of the text (e.g., STOP) is also red, this would violate the rule. If two data inputs result in a violation of the rule set forth in the knowledge graph reasoner 209, then the output of the visual attribute prediction model 208 with the lower confidence rating may be ignored. For example, if the output of the visual attribute prediction model 208 indicates that the color of the background and the color of the icon are indeed the same, then the prediction of the color with the lower confidence score can be ignored when querying the knowledge graph 210 (described later).

Figure 5:
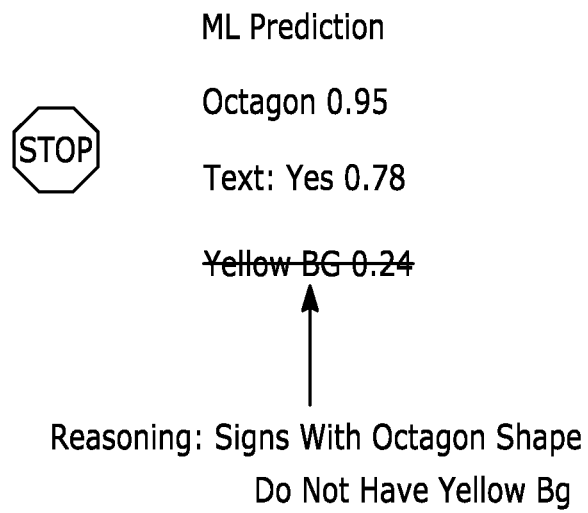
FIG. 5 illustrates use of a knowledge graph reasoning according to an embodiment.

In another example, a rule may indicate that signs with an octagon shape do not have a yellow background color. The output of the visual attribute prediction model 208 may output a predicted background color of red with a high confidence rating, and yellow with a lower confidence rating. The knowledge graph reasoner 209 can be relied upon to supplement the visual attribute prediction model 208 to determine that the yellow-color output from the visual attribute prediction model 208 violates the established rule that signs with octagon shapes do not have a yellow background. Thus, the system would ignore the yellow background color prediction. FIG. 5 illustrates an example of implementation of this. As shown in FIG. 5, the visual attribute prediction model 208 has output confidence ratings (on a scale of 0 to 1) of the following: octagon 0.95, the presence of text 0.78, and a yellow background color 0.24. Other attributes may also be determined such as the letters of the text, the color of the text, and a higher confidence that the background color is another color, such as red. Since the knowledge graph dictates a rule that signs with octagon shapes do not have yellow backgrounds, the output of the 0.24 confidence in a yellow background may be ignored by the system 200 such that it is not fed as input into the matching steps used in 210.

In another example, the knowledge graph may implement a rule that any confidence rating below a certain threshold is ignored. This may be implement regardless of any rules of signs, such as octagon shaped signs cannot be yellow; instead, this is merely a threshold-based rule stating that any confidence score below the threshold is ignored such that sign candidates pulled for comparison are not subject to that output from the visual attribute prediction 208. The threshold may be set at 0.7, although this threshold may be different, may be altered, and may be different values for different rules. Therefore, referring to the embodiment illustrated in FIG. 5, the yellow background prediction is ignored since the confidence score is only 0.24, which is below the threshold of 0.7.

Referring back to FIG. 2, the road sign content prediction system 200 then accesses or queries a road sign knowledge graph 210 to find sign candidates from a stored database with visual attributes that match the determined visual attributes of the analyzed road sign image. The query results may include the list of signs within a sign template database (e.g., stored in storage 110) and its embedded information. The signs in the sign template database may be manually entered, or may be stored as a result of running previous iterations of the system 200 (e.g., low-dimensional representation of a sign template generated through the few-shot learning models).

If there is another domain model for the sign candidate that that has a different sign class name and attributes, then the system can query the corresponding knowledge graph to get that information. For example, a single sign prototype can have multiple different sign classes for a certain application. In one example, a sign may say "EXIT" and also say "25 MPH" signifying that the speed limit on the exit is 25 mph. The sign may be classified as both an "exit" sign and a "speed limit" sign.

Referring back to FIG. 2, the road sign content prediction system 200 may also implement a few shot learning classification model, which trains the model to use real images as input, encode them to reduce dimension, to decode to represent prototype images. The trained classifier 212 may be configured to run to estimate the similarity in the latent space between a the cropped image output by the sign detector model 206 and the list of sign template candidates output by the road sign knowledge graph 210 after performing the visual attribute prediction model 208 with knowledge graph reasoning 209. The classifier 212 is configured to sort or rank the sign template candidates with a normalized distance value to report the top k (1, 2, 3, . . . ) candidates. In other words, the few-shot classifier categorizes or ranks the sign templates output from the road sign knowledge graph 210 based on their quantified similarities with the detected image. The system compares them in the latent space as mentioned above. The latent space (also known as embeddings) is a low dimension representation (compared to high dimension representation for real images or template).

The system may integrate the few-shot classifier or other machine learning model to predict top K road sign template candidates that are similar to the cropped image containing the road sign. The inputs for this model may be (1) the cropped image from the sign detector model 206, and (2) sign templates filtered by the road sign knowledge graph 210. These two inputs may be encoded into the latent space, and the nearest neighbor classification may be used to rank the road sign templates. The system may output the top K candidates 214, and if necessary, present them for human validation. Prediction of unseen classes may be crucial in the road sign annotation due to rare road signs in the long tail. Model prediction of conventional classification with known classes may assist human annotators effectively unless that model may be trained with large datasets that include rare classes. The encoder in the training phase of such a model encodes real images to latent distribution and the decoder reconstructs the encoded distribution back to a prototype that corresponds to the input image. By doing so, the trained encoder may be used as a feature extractor and the model learns image similarities and prototypical concepts instead of learning classification itself. Therefore, the pre-trained model can predict novel classes that are unknown during the training time.

If human validation is necessary, the system 200 proceeds to a human validation task 216. In embodiments, the system 200 proceeds to the human validation task 216 if one, several, or all of the top K candidates are below a threshold confidence level. The system 200 may create or require human validation for certain images depending on the prediction scores from the machine learning models and/or the domain expert's interest. Road signs that are rarely detected (e.g., rare signs) may cause human validation, for example. Rare sign categories or sign categories to improve machine learning models are varied over countries or regions. The system therefore dynamically constructs human validation with the rare road sign along with a list of its identification information, such as country of origin, region, and the like.

The human validation task 216 may present a human with the entire raw image that shows the bounding box over the detected road sign (see FIG. 6), or may present the human with only cropped images (see FIG. 7) for human validation. These two embodiments are described below. The human validated sign contents can then be updated in the storage or data management system.

Figure 6:
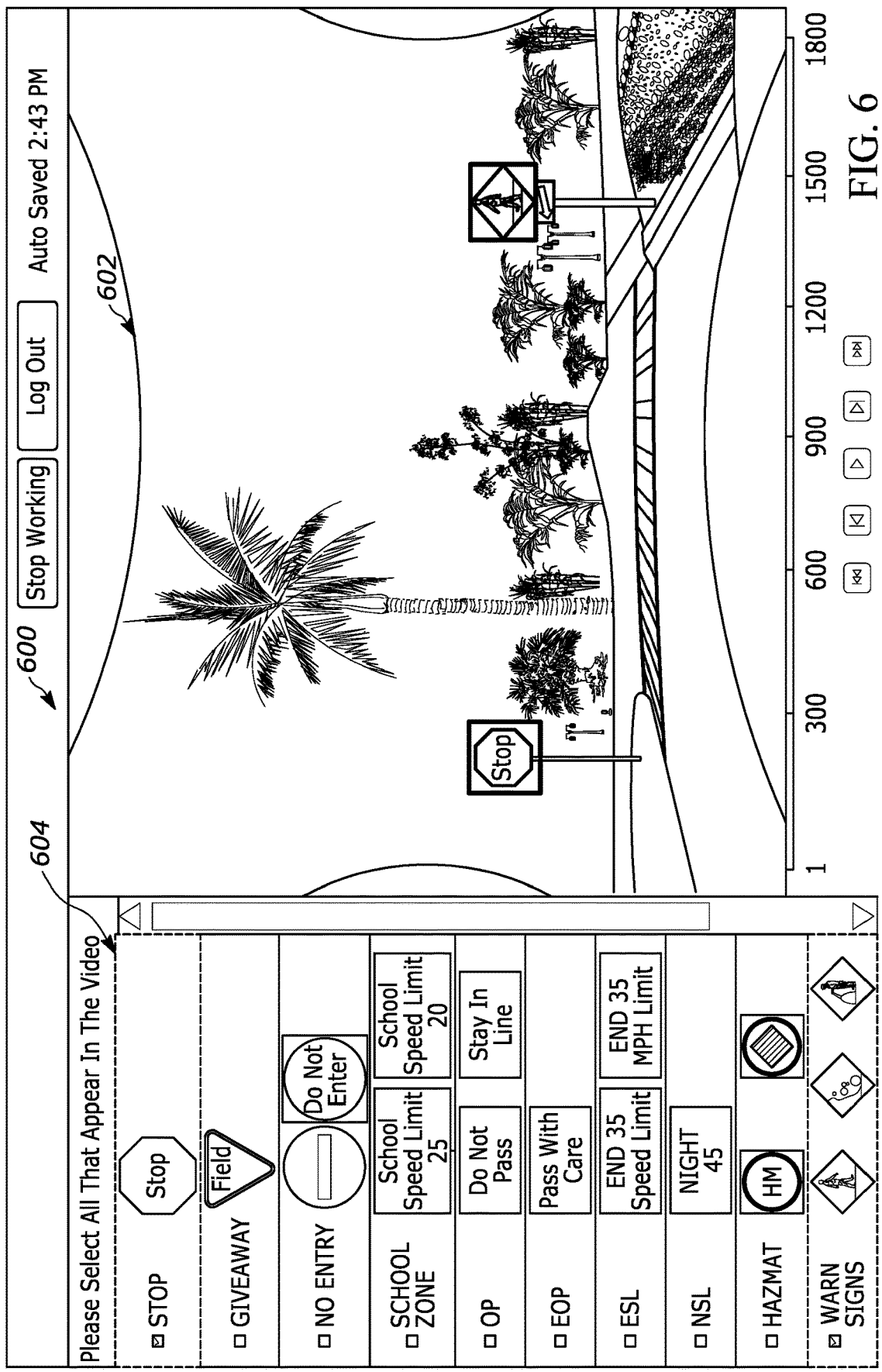
FIG. 6 illustrates a user interface for a human validation task with a sequence of frames or a video, according to an embodiment.

FIG. 6 illustrates one example of a user interface 600 associated with the human validation task 216. The user interface 600 may be visually presented on a screen of a client device, such as the client device 104 described above utilizing the associated structure described herein. The client device 104 may access the web application 124 for presentation of the user interface. The user interface 600 may include an image 602 and a selection region 604. The image 602 may be taken from the image source 130 and presented via image data 132. The image 602 may be a video or single image wherein the user is asked to select all road signs that appear in the video or image via the selection region. In this embodiment, a stop sign and a pedestrian crosswalk sign are present, and shown with an associated bounding box. The user thus selects the appropriate selections in the selection region 604 that corresponds to those signs.

Figure 7:
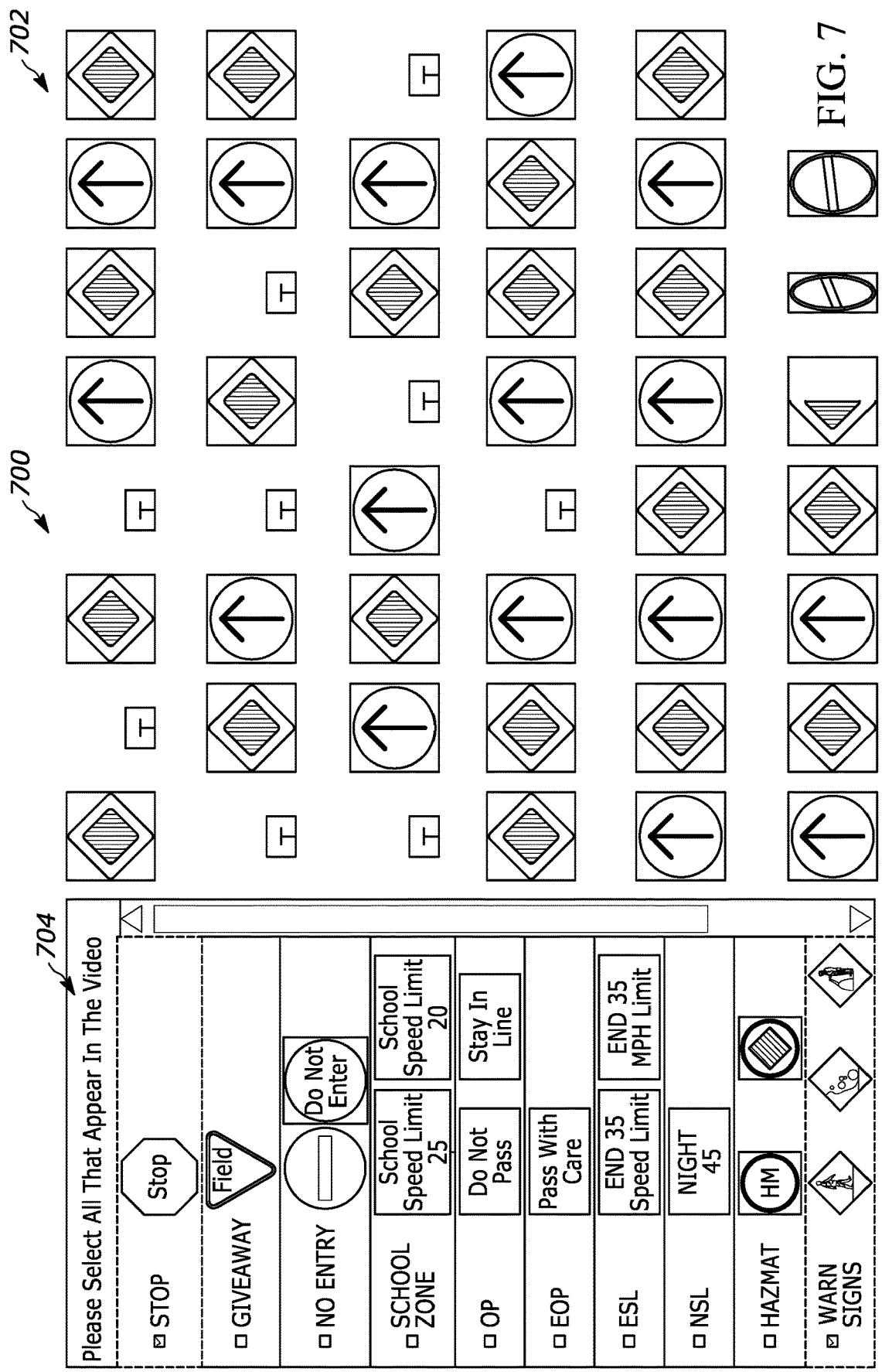
FIG. 7 illustrates a user interface for a human validation task with cropped road signs, according to an embodiment.

FIG. 7 illustrates a second example of a user interface 700 associated with the human validation task 216. The user interface 700 may once again be presented on a screen of a client device 104. The user interface 700 may include a sign image region 702 and a selection region 704. The image region 702 may include one or more captured images of one or more signs captured by the image source 130, and ask the human in the selection region 704 to select which signs appear in the image region 702.

Figure 8:
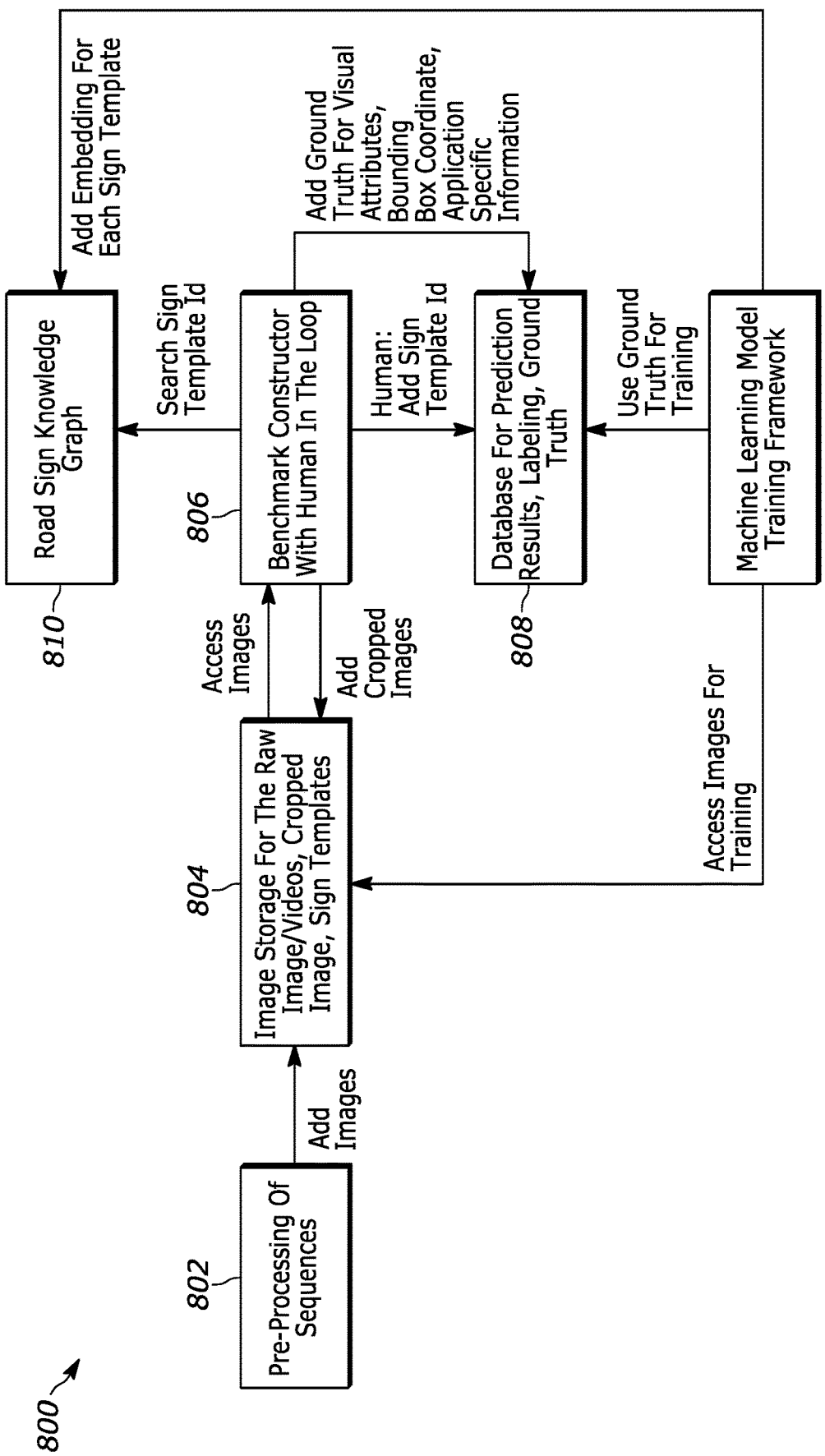
FIG. 8 illustrates an overview of a semi-automated benchmark construction system according to an embodiment.

FIG. 8 illustrates an overview of one embodiment of a semi-automated benchmark ground-truth construction system 800. The construction of the ground truths for various machine learning models including visual attributes can be time consuming if manually done. This benchmark ground-truth construction system 800 provides semi-automated ground truth construction if the ground truth for the road sign and road sign knowledge graphs are available.

In the illustrated embodiment, images can be pre-processed at 802 similar to methods described previously. The images are stored in storage (e.g., storage 110) at 804, which can include raw image and/or video feed, cropped images, sign templates, and the like. A benchmark constructor with human in the loop (more generally referred to as a ground truth constructor 806) can access the stored images 804, and also deposit cropped images into the storage. The ground truth constructor 806 is configured to parse ground truth files for selected sequences to have bounding box coordinates and crop the sign areas out of the images. The ground truth constructor 806 visualizes the cropped image and can provide a text box for a human to enter road sign knowledge graph information or identification at 808. The stored road sign knowledge graph 810 may have an interface to search signs with certain visual attributes. The ground truth constructor 806 is configured to automatically extract visual attributes and domain-specific or application-specific attributes such as sign category types and names that are needed for machine learning models.

It should be understood that there are various ways to interact with machine prediction when searching and selecting the images or videos for further data labeling. The systems disclosed herein visualize the distribution of road sign categories across different countries and regions with additional meta-data information and allows users to explore predicted sign content along with snapshots of the image or video, cropped signs and sign prediction scores and meta-data such as locational information. The system also provides the distribution of sign labels from the data labeling to quickly search sign categories with less labeling.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for training a machine learning model to recognize road signs, the system comprising:
   a user interface;
   a storage configured to maintain image data including video having a sequence of frames; and
   a processor in communication with the storage and the user interface, the processor programmed to:
      detect a road sign in the frames,
      crop at least one of the frames based on the detected road sign to produce a cropped image that includes the road sign,
      execute a visual attribute prediction model to determine probabilities of predefined visual attributes present in the cropped image,
      query a knowledge graph reasoner to access a plurality of rules relating to the predefined visual attributes,
      validate the visual attribute prediction model by removing at least one of the probabilities of presence of predefined visual attributes in the cropped image based on the rules, and
      output at least one sign candidate from a plurality of stored sign templates, wherein the at least one sign candidate matches the road sign within the cropped image based on the validated visual attribute prediction model.

2. The system of claim 1, wherein the processor is further programmed to:
   display, on the user interface, the cropped image and the at least one sign candidate for human validation that the road sign in the cropped image matches the at least one sign candidate.

3. The system of claim 1, wherein each of the rules involves at least two of the predefined visual attributes.

4. The system of claim 3, wherein at least one of the predefined visual attributes includes a background color of the road sign.

5. The system of claim 3, wherein at least one of the predefined visual attributes includes a shape of the road sign.

6. The system of claim 1, wherein the processor is further programmed to execute a few-shot classifier to estimate a similarity between the road sign within the cropped image and the plurality of stored sign templates, and wherein the at least one sign candidate output has a highest estimated similarity determined by the few-shot classifier.

7. The system of claim 1, wherein the visual attribute prediction model utilizes a Residual Network architecture.

8. A method for training a machine learning model to recognize road signs, the method comprising:
- maintaining image data including video having a sequence of frames;
- detecting a road sign in one of the frames;
- cropping at least one of the frames based on the detected road sign to produce a copped image that includes the road sign;
- executing a visual attribute prediction model to determine a plurality of probabilities of a presence of predefined visual attributes present in the cropped image;
- querying a knowledge graph reasoner to access a plurality of rules related to the predefined visual attributes;
- validating the visual attribute prediction model by removing at least one of the probabilities of presence of predefined visual attributes in the cropped image based on the rules; and
- outputting at least one sign candidate from a plurality of stored sign templates, wherein the at least one sign candidate matches the road sign within the cropped image based on the validated visual attribute prediction model.

9. The method of claim 8, further comprising:
- displaying, on a user interface, the cropped image and the at least one sign candidate for human validation that the road sign in the cropped image matches the at least one sign candidate.

10. The method of claim 8, wherein each of the rules involves at least two of the predefined visual attributes.

11. The method of claim 10, wherein at least one of the predefined visual attributes includes a background color of the road sign.

12. The method of claim 10, wherein at least one of the predefined visual attributes includes a shape of the road sign.

13. The method of claim 8, further comprising:
- executing a few-shot classifier to estimate a similarity between the road sign within the cropped image and the plurality of stored sign templates, wherein the at least one sign candidate output has a highest estimated similarity determined by the few-shot classifier.

14. The method of claim 8, wherein the visual attribute prediction model utilizes a Residual Network architecture.

15. A system for training a machine learning model to recognize road signs, the system comprising:
- a user interface;
- a storage configured to maintain (i) image data of a plurality of images, (ii) a list of predefined visual attributes found in images of road signs, and (iii) a plurality of stored sign template images; and
- a processor in communication with the storage and the user interface, the processor programmed to:
  - receive a cropped image of a road sign detected in an environment surrounding a vehicle,
  - execute a visual attribute prediction model to determine whether one or more of the predefined visual attributes are present in the cropped image, wherein the visual attribute prediction model is configured to assign a probability of presence to each of the one or more predefined visual attributes,
  - query a knowledge graph reasoner to access a plurality of rules relating to the one or more predefined visual attributes present in the cropped image,
  - validate the visual attribute prediction model by removing the probability of presence of at least one of the predefined visual attributes present in the cropped image based on the rules, and
  - output a sign template image from the plurality of stored sign template images that matches the road sign within the cropped image based on the validated visual attribute prediction model.

16. The system of claim 15, wherein the processor is further programmed to:
- display, on the user interface, the cropped image and the sign template for human validation that the road sign in the cropped image matches the at least one sign template.

17. The system of claim 15, wherein at least some of the rules are based on a presence or absence of certain visual attributes of the road sign.

18. The system of claim 17, wherein the rules involve visual attributes including at least one of a background color of the road sign, a shape of the road sign, text in the road sign, or arrows in the road sign.

19. The system of claim 15, wherein the processor is further programmed to execute a few-shot classifier to estimate a similarity between the road sign within the cropped image and the plurality of stored sign template images.

20. The system of claim 15, wherein the visual attribute prediction model utilizes a Residual Network architecture.

* * * * *